United States Patent Office 3,510,319
Patented May 5, 1970

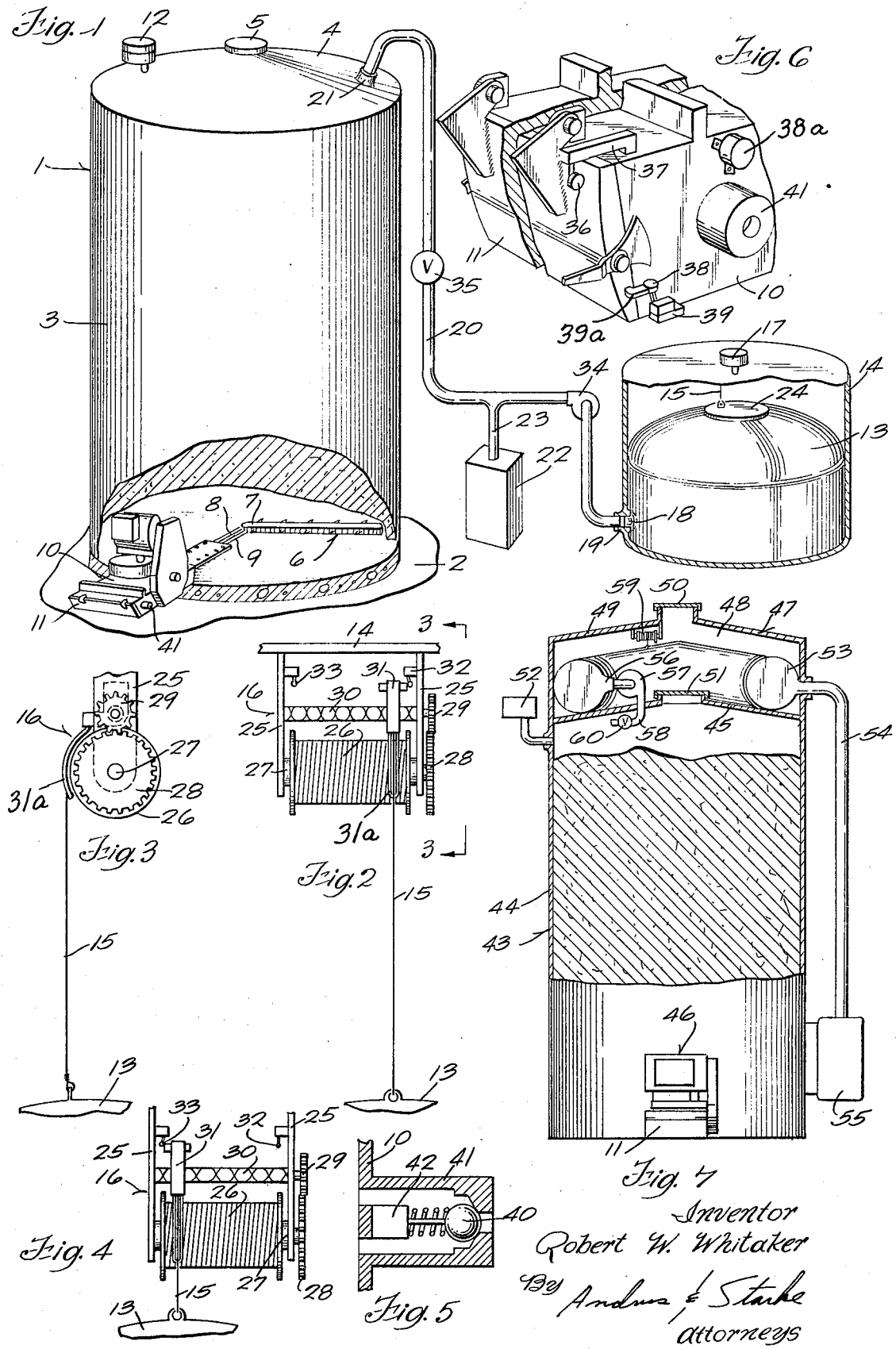

3,510,319
BREATHING SYSTEM FOR A SEALED STORAGE STRUCTURE
Robert W. Whitaker, Wauwatosa, Wis., assignor to A. O. Smith Corporation, Milwaukee, Wis., a corporation of New York
Filed Mar. 13, 1968, Ser. No. 712,746
Int. Cl. A01f 25/00; A23k 3/00
U.S. Cl. 99—235                                    18 Claims

ABSTRACT OF THE DISCLOSURE

The invention relates to a breather system for a sealed storage structure adapted to contain a perishable stored material. The breathing system includes a pressure responsive member, such as a breather bag, located in a protective shelter outside of the storage structure, and the interior of the bag is connected by a conduit to the upper end of the structure. A gas generating unit is connected to the bag and acts to generate an inert gas or a gas of reduced oxygen concentration to fill the bag and the upper end of the structure. The pressure of the gas within the bag and the structure is maintained at a slightly positive pressure with respect to the atmosphere so that any leakage through the structure will be outward to the atmosphere.

Pressure differentials existing between the interior and exterior of the storage structure are balanced by the gas within the bag, and the volume of gas in the bag is available to purge the storage structure after the unloading operation to expel any air that may have entered the structure during unloading.

---

Perishable material, such as silage, grain and the like, are frequently stored in an airtight or sealed silo to minimize contact with air and thereby prevent spoilage of the material. With a sealed storage structure silo, the stored material is normally unloaded by a bottom unloading mechanism similar to that shown in the patent to Tiedemann 2,635,770. An unloading mechanism of this type includes a cutter arm which is mounted for rotation around the center of the silo and rotates over the foundation to dislodge or undercut the stored material and move the dislodged material to the center of the silo where it falls into a radially extending trough in the foundation. A conveying unit operating within the trough moves the dislodged material to a housing on the exterior of the silo where it is discharged through a door to the exterior.

With the use of a sealed silo or storage structure, pressure differentials occur between the interior and the exterior of the silo due to the generation of gases, such as carbon dioxide, by the stored material, and due to variations in ambient temperature and/or atmospheric pressure. As a large pressure differential between the interior and exterior of the silo can cause undue stress on the walls of the silo, a relief valve is normally employed in the roof of the silo. The relief valve is set to permit air to enter the silo from the atmosphere when a predetermined negative pressure differential is exceeded, meaning that when the atmospheric pressure exceeds the internal pressure by a preset amount the valve will open to admit air to the silo. Similarly, the relief valve is set so that air is exhausted or vented from the interior of the silo when the pressure within the silo exceeds the atmospheric pressure by a predetermined amount.

In addition to the pressure relief valve, a pressure responsive member, such as a breather bag, is connected to the head space of the silo and serves to balance the pressure differentials between the extreme maximum and minimum settings of the relief valve. With larger volume silos more than one breather bag may be utilized. In the conventional breathing system the breather bag is located in the upper portion of the silo and the interior of the bag is connected through an opening in the silo roof to the atmosphere, while the exterior surface of the bag is subjected to the pressure within the silo. The breather bag serves to balance the interior pressure with the atmospheric pressure and yet prevents contact of the air with the stored material.

Even though the silo is sealed, there are occasions when air will enter the silo. For example, it has been found that during normal operating cycles, the interior pressure of the silo will frequently be lower than the atmospheric pressure, hence opening of the unloader door for unloading of the stored material will cause air to enter the silo. In the early morning the silo is normally at a negative pressure with respect to the atmosphere so that the breather bag is in an expanded condition. When the door of the unloader is open to discharge silage, air flows in to equalize the pressure between the interior and exterior of the silo, and as the pressures are equalized, the breather bag tends to collapse. As the breather bag has a substantial volume, generally in the neighborhood of 200 to 600 cubic feet, and the total breathing capacity when using more than one bag may approach 1500 cubic feet, the volume occupied by the expanded bag or bags is replaced by air coming in through the unloader discharge door. Thus, as the bag collapses, a substantial quantity of air is drawn into the silo through the unloader discharge door and the entry of air will tend to increase the oxygen concentration of the gas in the silo.

The present system is directed to an improved breather system for a sealed storage structure. The breathing system of the invention includes a pressure responsive member such as a breather bag which has a substantial volume and is located in a protective shelter outside of the storage chamber of the silo. The interior of the bag is connected by a conduit to the upper end of the structure, and a gas generating unit is connected to the bag and acts to generate an inert gas or a gas having a limited oxygen concentration that fills the headspace of the structure, as well as the bag. The pressure of the gas is maintained slightly over atmospheric pressure so that any leakage through the structure will be outward rather than inward in order to retain the controlled atmosphere in the silo.

As the bag is located outside of the silo or storage structure, the volume of the bag can be relatively greater in proportion to the volume of the silo than a system in which the breather bag is located within the silo. This enables the breather bag, in co-operation with the gas generating unit, to fully balance or compensate for pressure differentials caused by ambient temperatures or pressure variations.

In one form of the invention, the positive pressure of the gas in the bag and storage structure, tends to prevent entry of air into the silo when the unloader door is opened. When the silage is discharged through the unloader discharge door, the positive pressure existing within the storage structure will cause the gas to pass downwardly through the silage mass to prevent the entry of air into the structure through the discharge opening. This serves to minimize the amount of air which is drawn into the storage structure during the unloading cycle and thereby tends to prevent spoilage or deterioration of the stored material.

In a second form of the invention, the conduit leading from the bag to the headspace of the silo is automatically closed when the unloader door is opened. With the conduit closed, air can enter the silo during unloading if the atmospheric pressure exceeds the internal pressure of the silo. However, after the unloading operation is completed, the gas in the bag is discharged into the silo under a positive pressure by a blower, thereby purging the air from the silo through a vent located in the lower end of the silo.

Other objects and advantages will appear in the course of the following description.

The drawings illustrate the best mode presently contemplated of carrying out the invention.

In the drawings:

FIG. 1 is a diagrammatic perspective of a sealed storage structure incorporating the breather system of the invention;

FIG. 2 is a fragmentary vertical section of the gas generator control mechanism showing the bag in a deflated condition and the generator switch in the actuated position;

FIG. 3 is a section taken along line 3—3 of FIG. 2;

FIG. 4 is a view similar to FIG. 2 showing the bag in an expanded condition and the generator switch in the off position;

FIG. 5 is a longitudinal section of the vent valve;

FIG. 6 is an enlarged perspective view, with parts broken away, showing the discharge door structure; and FIG. 7 is a modified form of the invention showing a breather system in which the breather bag is housed in a shelter located on the top of the silo.

The drawings illustrate a sealed storage structure or silo 1 which is adapted to contain a perishable material such as silage, halage, shelled corn, grain or the like. The silo 1 is supported on a foundation 2 and includes a generally cylindrical wall 3 having an open top which is enclosed by a roof 4. The stored material, such as silage, is loaded into the silo through an opening 5 in the roof, and an unloader unit 6 is located in the bottom of the silo and serves to remove the silage from the silo. The unloader unit is similar to that disclosed in the Tiedemann Patent 2,635,770, and includes a cutter arm 7 which is journalled for rotation about the center of the silo and serves to cut or dislodge the silage and move the dislodged silage to the center of the silo where it falls into a radially extending trough 8 formed in the foundation 2. A conveyor unit 9 is mounted within the trough and extends within a housing 10 on the exterior of the silo. Conveyor unit 9 operates to move the dislodged silage outwardly to the housing 10 where it is discharged through an opening enclosed by a cam-locked door 11.

As pressure differentials occur between the interior of the silo and the atmosphere, due to the generation of gases such as carbon dioxide by the stored material, and due to ambient temperature and pressure changes, a relief valve 12 is mounted in the roof 4 and functions as a safety device to prevent excessive pressure differentials. The relief valve 12 operates between a minimum and maximum pressure differential and when the pressure within the silo exceeds the atmospheric pressure by a predetermined amount, the relief valve will open to permit the flow of gas outwardly to the atmosphere. Conversely, the relief valve is set so that when the atmospheric pressure exceeds the pressure within the silo by a predetermined amount, the relief valve will open to permit atmospheric air to enter the silo. For example, the relief valve in a typical airtight silo may be set to open to permit air to enter the silo when a negative pressure differential of —1.5 inches of water is exceeded and is set to open to exhaust gas to the atmosphere when a positive pressure differential of +3.5 inches of water is exceeded.

According to the invention, a breather system is employed to balance the pressure changes falling within the minimum and maximum levels determined by the relief valve 12. The breather system includes a flexible breather bag 13 which is located within a protective shelter 14 outside of the silo 1. The shelter 14 can be constructed of any desired material and need not be airtight, for the shelter merely serves as a protective enclosure for the bag.

In the expanded condition the bag substantially fills the shelter 14 and is provided with a shape that conforms generally to the shape of the shelter.

The bag 13 is mounted within the shelter 14, and a line 15 attached to the upper extremity of the bag. Line 15 is connected to a constant torque reel assembly 16 mounted in the upper end of shelter 14 beneath the vent cap 17. Reel 16 serves to wind and unwind the line 15 under a constant torque as the bag 13 inflates and deflates.

The lower end of bag 13 is provided with a neck 18 which is attached to a fitting 19 located in the wall of shelter 14. A conduit 20 is connected to fitting 19 and extends upwardly along the outer wall of the silo 1 and is connected to a fitting 21 in the roof 4 of the silo. Conduit 20 serves to connect the interior of the bag to the head space of the silo 1 above the level of the stored material within the silo. While the inner surface of the bag 13 is exposed to the interior of the silo 1, the outer surface of the bag 13 is exposed to the atmosphere through the vent opening in the upper end of shelter 14.

According to the invention, a gas generating unit 22 is connected by a conduit 23 to the conduit 20. The gas generating unit 22 is a conventional type having a relatively small capacity or output and is adapted to burn gas such as propane or natural gas. The combustion gases are discharged through the outlet conduit 23 and pass through the conduit 20 to both the head space of the silo 1 and to the interior of the bag 13. The composition of the gas generated by unit 22 can be varied within wide limits depending on the materials to be stored and the range of preservation desired. In some cases the gas generated may be substantially oxygen free, having an oxygen concentration less than 1%. In other instances, the gas may contain higher concentrations of oxygen in the range of 2 to 10%, but in any case the oxygen content of the gas generated by unit 22 is substantially less than the oxygen content of the air. In general, the generator unit 22 is designed to provide a desired gas composition capable of preventing deterioration of the particular product being stored.

The flexible bag 13 which contains the gas serves to balance pressure differentials falling between the minimum and maximum values determined by the relief valve 12. Pressure differentials between the interior and the exterior of the silo 1 can occur due to the generation of carbon dioxide by the stored material, or due to daily or seasonal temperature changes or atmospheric pressure variations. By locating the breather bag 13 in a shelter outside of the silo 1, a substantially larger capacity breather bag can be employed without restricting the capacity of the silo itself.

During normal operation, the unloader door 11 is frequently opened to discharge the stored material, and opening the dor 11 serves to expose the stored material to the atmosphere. In addition, small leakage may occur in the silo 1. When the interior of the silo is at a lesser pressure than atmospheric, air can thus be drawn into the silo either through the unloader door 11 or through leaks in the silo wall, and the introduction of air will tend to destroy the desired sealed characteristics of the silo and promote spoilage of the storage material. To prevent the passage of air into the silo, a slight positive pressure can be maintained on the gas in the bag 13 and in the head space of the silo 1. The slight positive pressure can be achieved by the weight of the bag itself, or if the bag is fabricated from very lightweight material, by applying additional weight to the upper surface of the bag. The additional weight can take the form of metal weights or it may take the form of layers or strips of fabric applied to the upper surface of the bag as indicated by 24. The weight 24 serves to exert a pressure on the gas in the bag 13 and thereby maintains the gas at a slightly positive pressure to the atmosphere.

The present invention also has a mechanism for automatically operating the gas generating unit 22 when the bag 13 deflates to a predetermined position. The operating mechanism is associated with the constant torque reel assembly 16 and is best shown in FIGS. 2–4. The reel assembly 16 includes a pair of side plates 25 which are secured to the roof of the shelter 14. A reel 26 is mounted on shaft 27 journalled between side plates 25 and cable or line 15 is attached to the reel. As previously mentioned, reel 26 is a constant-torque type, providing a uniform torque on line 15 as the line winds or unwinds from the reel.

Shaft 27 is connected by gears 28 and 29 to screw 30 journalled between side plates 25 so that rotation of shaft 28 will be transmitted to the screw. Nut 31 is threaded on the screw and carries an eyelet 31a which receives line 15. As the bag 13 deflates, line 15 will be played out, causing reel 26 and screw 30 to rotate and thereby moving nut 31 in one direction along the screw. As the bag inflates, as shown in FIG. 4, the line 15 will be retracted, causing reel 26 and screw 30 to rotate in the opposite direction and thereby move nut 31 in the opposite direction along the screw. Located at opposite ends of screw 30 are an "on" switch 32 and an "off" switch 33 both of which are operably connected to gas generator 22. When nut 31 moves to the right in FIG. 2, as the bag deflates, it will actuate switch 32 to start the gas generator 22. As the pressure builds up within the bag 13, the bag expands and line 15 will be retracted, causing nut 31 to move in the opposite direction, to the left in FIG. 2. When nut 31 contacts switch 33, operation of the gas generator 22 is stopped.

The breather bag 13 cooperates with the gas generating unit 22 to serve as a storage reservoir for the gas so that a relatively small capacity gas generating unit can be utilized. Without the use of the breather bag 13, it would be necessary to employ a large capacity gas generator in order to fulfill the demand for gas under extreme pressure differentials.

As an added feature, a purging system can be employed to purge the silo of air after the unloading operation. To accomplish the purging action, a blower 34 is connected in conduit 20 and the blower is actuated either manually or through suitable automatic controls, whenever the unloader door 11 is opened. Operation of the blower 34 will act to draw the gas from bag 13 and discharge it into silo 1, where the gas will pass downwardly through the silage mass and exit through the unloader door opening. However, this method may result in a complete deletion of the gas supply particularly when long unloading periods are required.

As an alternate purging system, a solenoid valve 35 is located in conduit 20 and is operably connected to a switch 36 carried by bracket 37 on unloader housing 10. Switch 36 is pivotally connected to the outer end of bracket 37 and is adapted to be pivoted outwardly when the unloader door 11 is opened, outward pivotal movement of switch 36 serves to close the switch contacts, thereby energizing the solenoid and closing the valve 35 in conduit 20 so that gas from bag 13 cannot flow to the silo 1 when the unloader door is opened. During unloading, if the interior of the silo is at a negative pressure with respect to the atmosphere, air will enter the unloader through the open unloader door 1, or even if equalized pressure conditions exists, the operation of the conveyor will tend to create turbulence and draw air into the silo. After completion of unloading, closing of the unloader door will release switch 36 and thereby open solenoid valve 35 in conduit 20.

Closing of unloader door 11 actuates a second switch 38 pivotally mounted on bracket 39 on housing 10, arm 39a is secured to the lower end of door 11 and when door 11 is closed, the arm 39a pivots switch 38 to close the switch contacts. Switch 38 is connected through a conventional timing mechanism 38a to the blower 34. Actuation of switch 38 by arm 39a will then operate blower 34 for a preset timed period, and as valve 35 in conduit 20 is open, the blower will draw the gas from bag 13 and discharge the gas into the silo and through the silage mass to purge any air from the silage mass which may have entered the silo during unloading. The air, as well as the purging gas, is discharged from the lower end of silo 1 through spring-loaded valve 40 which is located in conduit 41 connected to the unloader housing 10. Valve 40 is opened by a solenoid 42 which is operably connected through the timer 38a to switch 38 so that actuation of switch 38 on closing of door 11 will operate the blower 34 and open the vent valve 40 for a timed period to purge the air from the silo.

When the blower 34 is not operating it will cause no significant restriction to free gas flow within the conduit 20.

FIG. 7 illustrates a modified form of the invention in which the pressure responsive bag is located in a compartment above the silo rather than in a separate shelter as shown in FIGS. 1–5. In this embodiment the storage structure or silo 43 includes a generally cylindrical wall 44 which is enclosed at its upper end by a roof 45. The stored material which can be silage, halage, shelled corn or the like is unloaded from the silo 43 by a bottom unloading unit 46, similar in structure to the unloading unit 6 of the first embodiment.

A housing 47 is mounted on the roof 45 and defines an enlarged chamber 48 with the roof. The top surface 49 of housing 47 is provided with a central opening which is enclosed by a removable cover 50, and the opening in the top surface 49 is in vertical alignment with an opening in the roof 45 which is similarly enclosed by a cover 51. To load the silo, the covers 50 and 51 are removed and the material to be stored is introduced into the silo 1 through the aligned openings.

To prevent excessive pressure differentials between the interior of the silo 43 and the atmosphere, a relief valve 52, similar to relief valve 12, is mounted within an opening in the silo 43 and communicates with the head space of the silo.

According to the invention, a breather bag 53 is located within the chamber 48, and bag 53 has an annular or doughnut shape having a central opening which provides communication between the opening in the surface 49 and the opening in roof 45. As shown in FIG. 7, the bag, when in the inflated condition has a shape which complements the shape of the chamber 48.

A conduit 54 connects the bag 53 and a gas generator 55 which is mounted on the outside of the silo. The generator 55 is similar in structure and function to the generator 22 described in connection with the first embodiment.

Breather bag 53 is also provided with a neck 56 which is connected to the inlet of a blower 57 similar to blower 34 of the first embodiment. The outlet 58 of blower 57 extends through an opening in the roof 45 and communicates with the head space of the silo.

The gas generator 55 is operated in a manner similar to that previously described by a switch associated with a constant torque reel assembly 59 suspended from the top surface 49 of housing 47. The reel assembly 59 acts in a manner similar to the reel assembly 16 to actuate the gas generator 55 when the bag 53 deflects to a predetermined condition.

A purging system similar to that previously described can be associated with the silo 43 of FIG. 7. In this case a solenoid operated valve 60 is located in the conduit 58, and the valve 60 is opened and closed and the blower 57 is operated in response to the actuation of switches similar to switches 36 and 38, which are controlled by opening and closing of unloader door 11.

While the drawings illustrate a breathing system employing a single bag 13 or 53, it is contemplated that a series of bags similar to breather bag 13 can be employed, depending on the capacity of the silo.

Furthermore, the invention as shown in the drawings, illustrates the interior of the bag 13 or bag 53 being connected with the interior of the silo 1. In some cases it may be preferred to reverse the connections so that the interior of the breather bag is exposed to the atmosphere and the exterior of the bag is exposed to the pressure within the silo. In this latter case the gas generating unit would be in communication with the interior of the silo and the exterior of the bag, and the shelter 14 or compartment 48 would have to be constructed in an airtight manner.

I claim:
1. In a sealed storage structure having an unloading unit within the structure and operable to discharge the storage material through a discharge opening in the structure, a flexible pressure responsive member located outside of the structure, means for exposing one surface of said pressure responsive member to the atmosphere, conduit means for exposing the opposite surface of said pressure responsive member to the interior of said storage structure, and a gas generating unit located outside of said storage structure and connected to said conduit means, said gas generating unit acting to generate a gas having an oxygen content less than that of air, said gas acting against said opposite surface of the pressure responsive member and being in contact with the stored material in said storage structure to thereby retard deterioration and spoilage of the stored material.
2. The apparatus of claim 1 wherein said pressure responsive member is a bag.
3. The structure of claim 1, wherein the interior of said structure, said pressure responsive member and said conduit means comprise a closed gas system, and means for maintaining the gas in said closed system at a positive pressure with respect to the atmosphere whereby any leakage in said system will result in the gas within said system flowing outwardly to the atmosphere.
4. The structure of claim 3, wherein said means for maintaining the gas at a positive pressure comprises a weight associated with said pressure responsive member.
5. The structure of claim 1, wherein said pressure responsive member is located within a shelter and said conduit means comprises a conduit connecting the upper end of said storage structure to said shelter.
6. The structure of claim 5, and including blower means disposed in said conduit and operative to direct gas in a direction from said pressure responsive member to said storage structure.
7. The structure of claim 1, and including means responsive to a predetermined deformation of said pressure responsive member in one direction to actuate said gas generating unit.
8. The structure of claim 7, and including means responsive to a predetermined deformation of said pressure responsive member in the opposite direction to stop operation of said gas generating unit.
9. The structure of claim 1, and including a closure mounted on top of said storage structure and defining a compartment with said storage structure, said flexible pressure responsive member being a bag disposed within said compartment.
10. A storage unit, comprising a sealed storage vessel, to contain a perishable stored material and having a discharge opening therein for discharge of the stored material, a closure to enclose said discharge opening, unloading means located within the vessel and disposed to dislodge the stored material and discharge the dislodged material through said discharge opening, a flexible gas storage bag located outside of the vessel, conduit means connecting the interior of said bag to the interior of the vessel with the exterior surface of the bag being exposed to the atmosphere, the interior of said vessel, said conduit means and the interior of said bag comprising a closed gas system, and a gas generating unit located outside of said vessel and connected to said closed gas system, said gas generating unit acting to generate a gas having an oxygen content less than the air.
11. The structure of claim 10, and including a valve located in said conduit means between said vessel and said gas generating unit, and means responsive to said closure being moved to an open position for closing said valve and preventing gas from said bag from entering the interior of said vessel.
12. The structure of claim 11, and including means responsive to the closure being moved to a closed position for opening said valve to permit gas from said bag to flow to the interior of said vessel.
13. The unit of claim 10, and including means responsive to a predetermined degree of deflation of said bag for actuating said generating unit and supplying gas to said system, and means responsive to a predetermined degree of inflation of said bag for stopping operation of said generating unit.
14. The structure of claim 10, and including valve means located in said conduit means between said vessel and said gas generating unit, blower means disposed in said conduit means and being operative to move gas from said bag to said vessel, means responsive to said closure being moved to an open position for closing said valve means and preventing gas from said bag from entering said vessel, means responsive to the closure being moved to a closed position for opening said valve means and for operating said blower means to move gas from the bag into the vessel, and timer means operably connected to said blower means to stop operation of said blower means after a predetermined time period.
15. The structure of claim 14, and including check valve means communicating with the interior of the vessel and operative to permit gas flow from the vessel to the exterior when the blower means is operating and to prevent gas flow in the opposite direction.
16. A storage unit, comprising a sealed vessel to contain a perishable stored material, a gas reservoir, conduit means connecting the interior of the vessel and the reservoir, said reservoir, conduit means and the interior of said vessel comprising a closed system, means for balancing the pressure within the closed system with atmosphere pressure, and gas generating means connected to said closed system for generating a gas having an oxygen content less than air, said gas filling said closed system and acting to retard spoilage of said stored material.
17. The structure of claim 16, and including blower means associated with said closed system, said blower being operative to move gas from said reservoir to said vessel.
18. The structure of claim 17, and including check valve means communicating with the interior of the vessel to permit gas to flow from the vessel to the atmosphere and prevent gas flow in the opposite direction.

References Cited

UNITED STATES PATENTS

| | | |
|---|---|---|
| 3,125,014 | 3/1964 | Herbruck. |
| 3,193,058 | 7/1965 | Ebbinghaus _____ 99—235 XR |
| 3,211,303 | 10/1965 | Van der Linde et al. 99—235 XR |
| 3,277,812 | 10/1966 | Behlen. |

WALTER A. SCHEEL, Primary Examiner

J. M. BELL, Assistant Examiner

U.S. Cl. X.R.

99—269; 220—85